United States Patent
Yamada

(10) Patent No.: US 8,368,744 B2
(45) Date of Patent: Feb. 5, 2013

(54) IMAGE DISPLAY APPARATUS, IMAGE PROCESSING DEVICE, AND IMAGE PROCESSING METHOD

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

(21) Appl. No.: 13/184,216

(22) Filed: Jul. 15, 2011

(65) Prior Publication Data

US 2012/0212591 A1 Aug. 23, 2012

(30) Foreign Application Priority Data

Feb. 21, 2011 (JP) .................... 2011-035020

(51) Int. Cl.
 *H04N 13/04* (2006.01)
 *H04N 9/47* (2006.01)
(52) U.S. Cl. .......................... 348/54; 348/51
(58) Field of Classification Search .............. 348/51, 348/54
 See application file for complete search history.

(56) References Cited

U.S. PATENT DOCUMENTS

| | | | |
|---|---|---|---|
| 2003/0052836 A1* | 3/2003 | Matsumoto et al. | 345/6 |
| 2003/0214459 A1* | 11/2003 | Nishihara et al. | 345/6 |
| 2004/0240056 A1* | 12/2004 | Tomisawa et al. | 359/462 |
| 2009/0079733 A1 | 3/2009 | Fukushima et al. | |

FOREIGN PATENT DOCUMENTS

| | | |
|---|---|---|
| JP | 09-102968 | 4/1997 |
| JP | 10-336706 | 12/1998 |
| JP | 2002-148561 | 5/2002 |
| JP | 2004-212666 | 7/2004 |
| JP | 2004-349736 | 12/2004 |
| JP | 2009-077234 | 4/2009 |

OTHER PUBLICATIONS

Japanese Patent Application No. 2011-035020; Notice of Reasons for Rejection; Mailed Dec. 6, 2011 (English translation).

* cited by examiner

*Primary Examiner* — Joseph Ustaris
*Assistant Examiner* — Anner Holder
(74) *Attorney, Agent, or Firm* — Blakely, Sokoloff, Taylor & Zafman LLP

(57) ABSTRACT

According to one embodiment, an image display apparatus includes a rearranging module, a scaling module, a display, and a parallax controller. The rearranging module is configured to rearrange a plurality of first parallax image signals in series in accordance with colors of the first parallax image signals to generate a second parallax image signal. The scaling module is configured to scale the second parallax image signal in a horizontal direction to generate a third parallax image signal. The display is configured to display at least a part of the third parallax image signal. The parallax controller is configured to output light emitted from the display to a specific direction.

12 Claims, 7 Drawing Sheets

IMAGE DISPLAY APPARATUS, IMAGE PROCESSING DEVICE, AND IMAGE PROCESSING METHOD

CROSS REFERENCE TO RELATED APPLICATIONS

This application is based upon and claims the benefit of priority from the prior Japanese Patent Application No. 2011-35020, filed on Feb. 21, 2011, the entire contents of which are incorporated herein by reference.

FIELD

Embodiments described herein relate generally to an image display apparatus, an image processing device, and an image processing method.

BACKGROUND

In recent years, stereoscopic image display apparatuses which display video signals stereoscopically have been widely used. In a stereoscopic image display apparatus, parallax images viewed from different viewpoints are displayed, and different parallax images are viewed with the left eye and the right eye. Accordingly, video signals can be stereoscopically viewed.

According to an autostereoscopic manner, which is one of the techniques for displaying stereoscopic images, parallax images are simultaneously displayed on a liquid crystal display, for example, and a lenticular lens is placed on the liquid crystal display. By viewing the liquid crystal display through the lenticular lens, the viewer can view different parallax images with the left eye and the right eye. By the autostereoscopic manner, however, the region where images are stereoscopically viewed cannot be made sufficiently large.

DETAILED DESCRIPTION

In general, according to one embodiment, an image display apparatus includes a rearranging module, a scaling module, a display, and a parallax controller. The rearranging module is configured to rearrange a plurality of first parallax image signals in series in accordance with colors of the first parallax image signals to generate a second parallax image signal. The scaling module is configured to scale the second parallax image signal in a horizontal direction to generate a third parallax image signal. The display is configured to display at least a part of the third parallax image signal. The parallax controller is configured to output light emitted from the display to a specific direction.

Embodiments will now be explained with reference to the accompanying drawings.

Figure 1:
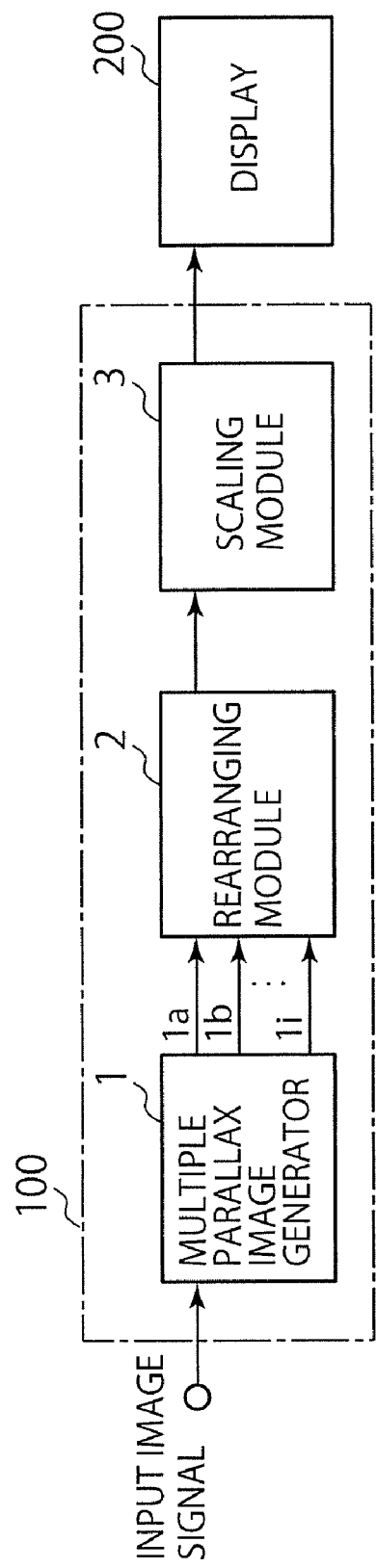
FIG. 1 is a schematic block diagram of an image display apparatus according to an embodiment.

FIG. 1 is a schematic block diagram of an image display apparatus according to an embodiment. The image display apparatus has an image processing device 100 and a display 200. The image processing device 100 has a multiple parallax image generator 1, a rearranging module 2, and a scaling module 3.

The multiple parallax image generator 1 generates parallax image signals 1a through 1i viewed from different viewpoints, based on an input image signal that is a two-dimensional image signal to supply them to the rearranging module 2. More specifically, the following procedures are carried out. In a parallax image viewed from the left side, for example, an object existing at near-side appears shifted to the right side comparing to an object existing at further-side. Therefore, based on depth information that is inputted from outside or obtained by analyzing the input image signal, the multiple parallax image generator 1 shifts the object existing at near-side in the input image signal to the right side. The larger the depth is, the longer distance the object is shifted. The position where the object originally existed is interpolated with the surrounding pixels as needed.

Figure 2:
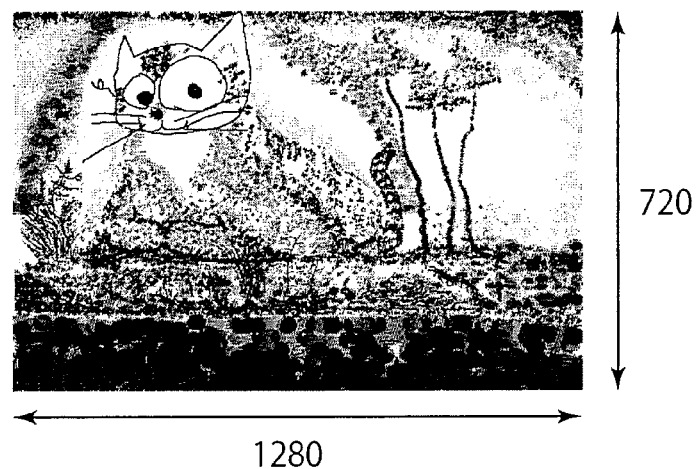
FIG. 2 is a diagram showing an example of an input image corresponding to the input image signal.
Figure 3:
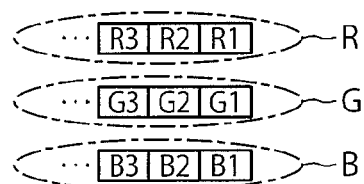
FIG. 3 is a diagram showing an example of a configuration of the input image signal.

FIG. 2 is a diagram showing an example of an input image corresponding to the input image signal. The present embodiment shows an example where an input image having ""1280"" pixels in the horizontal direction and ""720"" pixels in the vertical direction is inputted. FIG. 3 is a diagram showing an example of a configuration of the input image signal. The input image signal includes three signals, that is, a red signal R, a green signal G, and a blue signal B each having ""10"" bits, for example. In FIG. 3, the signal values are represented by R1, R2, . . . , and the like.

Figure 4:
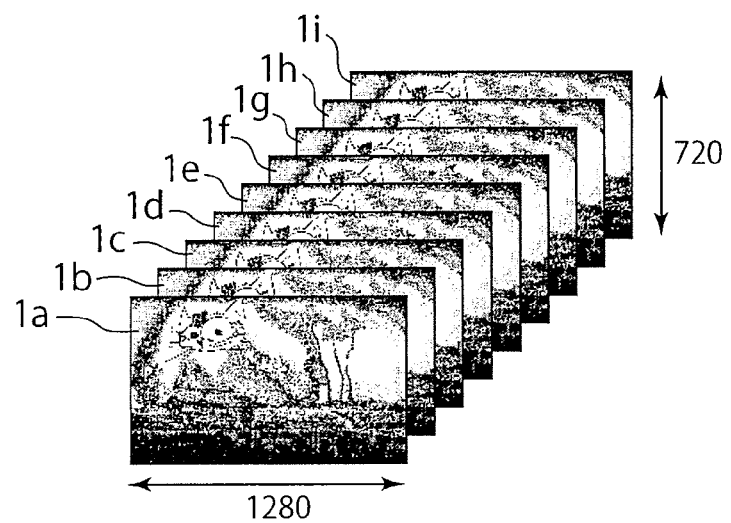
FIG. 4 is a diagram showing an example of parallax images corresponding to the parallax image signals 1a through 1i generated by the multiple parallax image generator 1.

FIG. 4 is a diagram showing an example of parallax images corresponding to the parallax image signals 1a through 1i generated by the multiple parallax image generator 1. In this embodiment, the first through ninth parallax image signals 1a through 1i, which are viewed from nine viewpoints arranged from left to right in the horizontal direction, are generated. Those signals will be collectively referred to as a multiple parallax image signal (the first parallax image signal). The first through ninth parallax images corresponding to the first through ninth parallax image signals 1a through 1i respectively will be collectively referred to as multiple parallax images.

Figure 5:
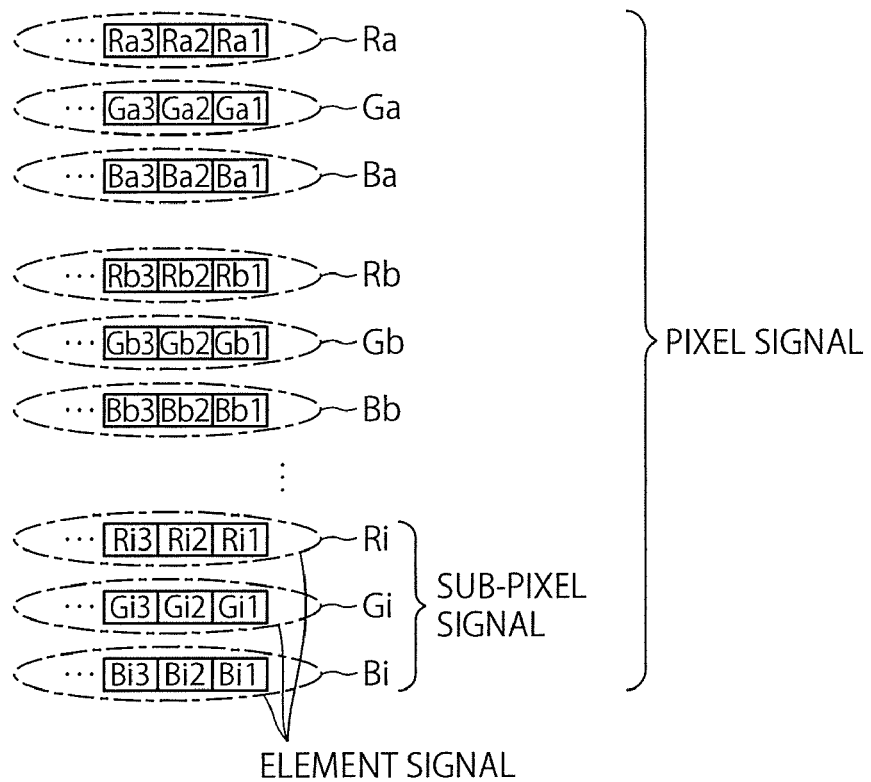
FIG. 5 is a diagram showing an example of a configuration of the multiple parallax image signal.

FIG. 5 is a diagram showing an example of a configuration of the multiple parallax image signal. The nth parallax image signal 1x (x=a through i) viewed from the nth viewpoint (n=""1"" through ""9"") includes three signals, that is, a red signal Rx, a green signal Gx, and a blue signal Bx each having ""10"" bits, for example. Accordingly, the multiple parallax image signal includes twenty-seven signals in total. In FIG. 5, the signal values of those signals are represented by Ra1, Ra2, . . . , and the like.

Hereinafter, each of the red signal Rx, the green signal Gx, and the blue signal Bx will be referred to as an element signal. The three signals Rx, Gx, and Bx forming the nth parallax image will be collectively referred to as an nth sub-pixel signal. The sub-pixel signals in the multiple parallax image signal will be collectively referred to as a three-dimensional image pixel signal (or simply as the pixel signal). That is, the three-dimensional image pixel signal has nine sub-pixel signals, in other words, twenty-seven element signals.

In this embodiment, the multiple parallax image generator 1 is provided in the image processing device 100. However, the multiple parallax image generator 1 may not be provided, and the first through ninth parallax image signals may be supplied to the rearranging module 2 from outside, for example.

Figure 6:
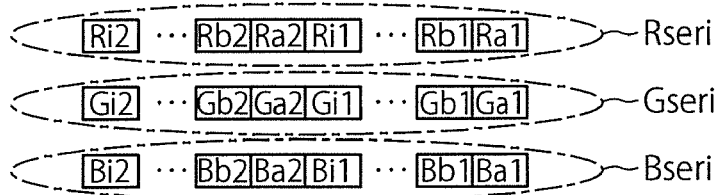
FIG. 6 is a diagram showing an example of a configuration of the successive parallax image signal.

The rearranging module 2 shown in FIG. 1 then rearranges the twenty-seven signals in the multiple parallax image signal in series in accordance with colors of the signals, to generate a successive parallax image signal (the second parallax image signal). FIG. 6 is a diagram showing an example of a configuration of the successive parallax image signal. The successive parallax image signal includes three signals, that is, a red signal Rseri where the red signals Ra through Ri are successive, a green signal Gseri where the green signals Ga through Gi are successive, and a blue signal Bseri where the blue signals Ba through Bi are successive. In this manner, the rearranging module 2 converts the plurality of (parallel) signals shown in FIG. 5 into the successive (serial) signal by the color as shown in FIG. 6.

In this embodiment, the number of pixels in the horizontal direction of the input image signal is "1280", and the nine parallax images are generated. Therefore, each of the red signal Rseri, the green signal Gseri, and the blue signal Bseri in the successive parallax image signal has "1280*9" values in each frame in the horizontal direction.

The scaling module 3 shown in FIG. 1 then enlarges the successive parallax image signal with a predetermined scaling factor in the horizontal direction. Although the scaling factor will be explained later in detail, the successive parallax image signal is enlarged with a scaling factor of (1280*9+4)/(1280*9) in the present embodiment in order to increase the number of values in the horizontal direction by four.

Figure 7:
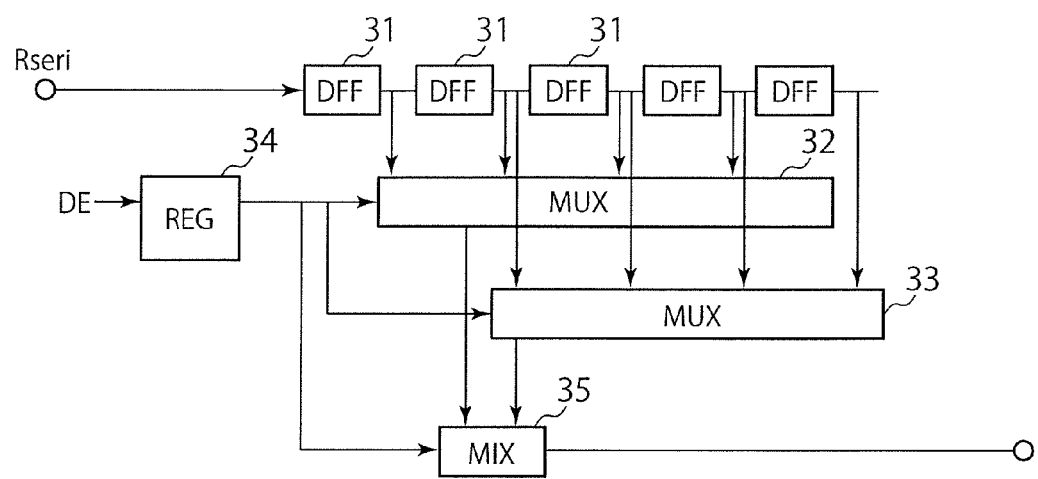
FIG. 7 is a block diagram showing an example of an internal configuration of the scaling module 3.

FIG. 7 is a block diagram showing an example of an internal configuration of the scaling module 3. The scaling module 3 has delay modules (DFF) 31, two selectors (MUX) 32 and 33, a register (REG) 34, and a mixing module (MIX) 35. Although not shown, three scaling modules 3 for the red signal Rseri, the green signal Gseri, and the blue signal Bseri are provided. In the following, the scaling module 3 for the red signal Rseri will be described.

Each of the delay modules 31 delays the red signal Rseri to generate delay signals. Each of the selectors 32 and 33 selects one of the delay signals under the control of the register 34. The register 34 supplies the mixing module 35 with two of coefficients that are predetermined in accordance with the scaling factor. The mixing module 35 adds the value obtained by multiplying one of the supplied coefficients by the delay signal selected by the selector 32, to the value obtained by multiplying the other one of the supplied coefficients by the delay signal selected by the selector 33. According to a signal DE indicative of the horizontal data effective period, the register 34 controls the delay signal to be selected, and supplies the coefficients to the mixing module 35. In this manner, an enlarged successive parallax image signal (a third parallax image signal) having the 1280*9+4 values in the horizontal direction is generated, and is supplied to the display 200.

Figure 8:
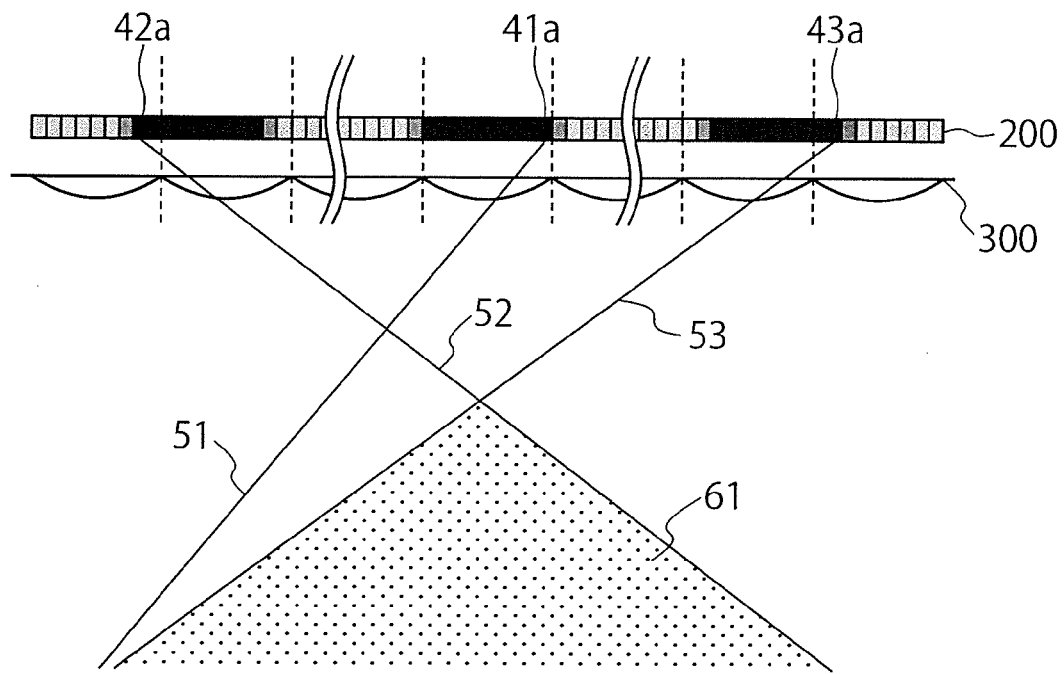
FIG. 8 is a cross-sectional view of the display 200 and the lenticular lens 300.

The display 200 shown in FIG. 1 is a liquid crystal display, for example. A lenticular lens (the parallax controller) 300 is attached to the display 200. FIG. 8 is a cross-sectional view of the display 200 and the lenticular lens 300. The display 200 has pixels for displaying the successive parallax image signal.

Figure 9:
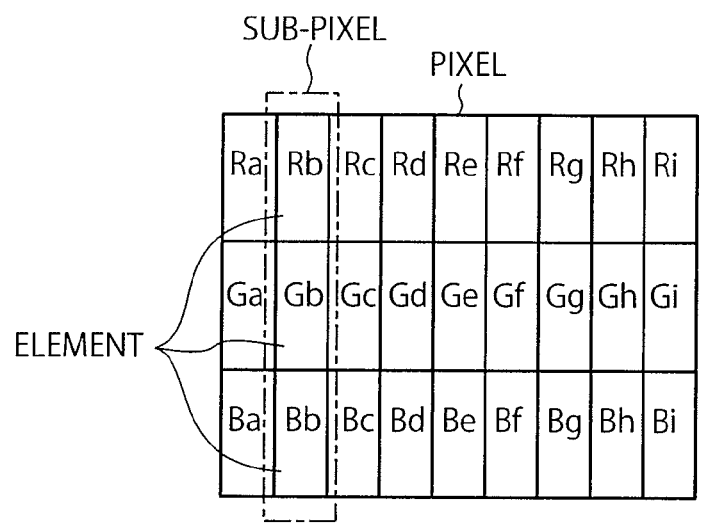
FIG. 9 is a diagram showing a pixel configuration of the display 200.

FIG. 9 is a diagram showing a pixel configuration of the display 200. As shown in FIG. 9, each pixel has first through ninth sub-pixels arranged in the horizontal direction. The nth pixel has elements Rx, Gx, and Bx arranged in the vertical direction. The elements Ra through Ri, Ga through Gi, and Ba through Bi emit light whose brightness depends on the values of the red signals Ra through Ri, the green signals Ga through Gi, and the blue signals Ba through Bi respectively, which correspond to element signals. Each rectangle in the display 200 shown in FIG. 8 represents a sub pixel.

In the example shown in FIG. 8, the display 200 has "1280" pixels or "1280*9" sub-pixels in the horizontal direction. Among the successive parallax image signal generated by the scaling module 3 having "1280*9+4" values in the horizontal direction, two values corresponding to two sub-pixels on the left end and two values corresponding to two sub-pixels on the right end are not displayed on the display 200, while the "1280*9" values in the center are displayed on the display 200.

The lenticular lens 300 shown in FIG. 8 has "1280" convex portions in the horizontal direction, and is attached to the display 200 so that each of the convex portions corresponds to the respective "1280" pixels in the display 200. The light emitted from the sub-pixels in each pixel is outputted from the top of each corresponding convex portion. For example, the light emitted from a sub-pixel 41a is outputted in the direction represented by a straight line 51. The light emitted from the sub-pixels located in the surrounding areas of the pixels corresponding to the respective convex portions are also outputted through the lenticular lens 300 in accordance with the distance between the display 200 and the lenticular lens 300. For example, among the successive parallax image signal, the light emitted from the seventh sub-pixel 42a from the left end is outputted in the direction represented by a straight line 52, and the light emitted from the seventh sub-pixel 43a from the right end is outputted in the direction represented by a straight line 53.

As a result, the image can be stereoscopically viewed by a viewer who exists in the region 61 inside the straight line 52 and the straight line 53 (the dotted region in FIG. 8).

Figure 10:
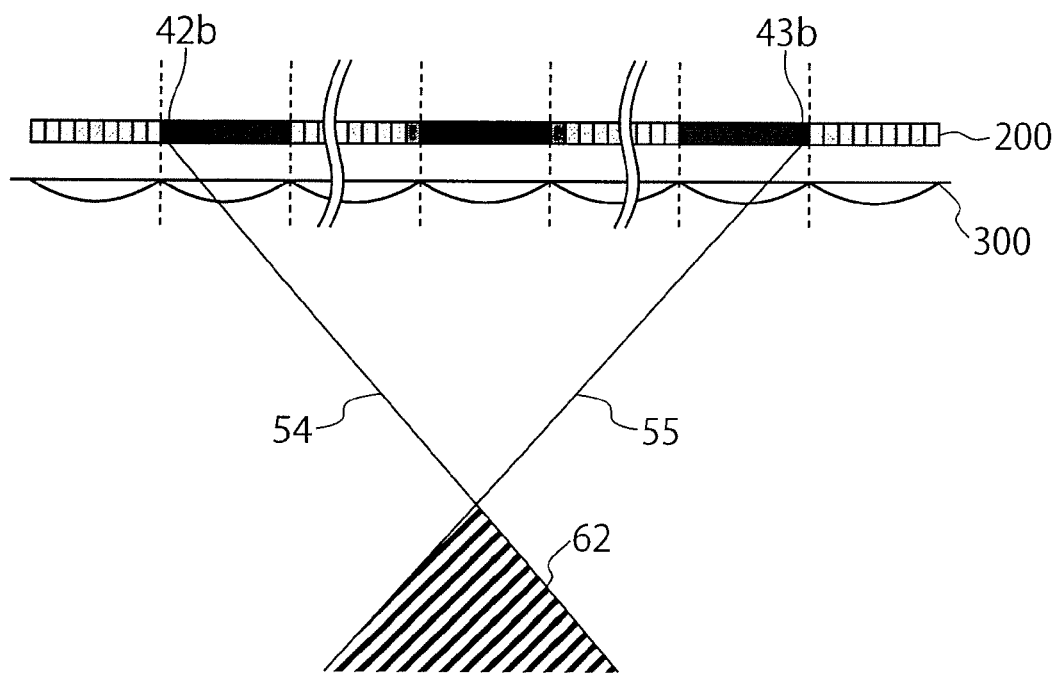
FIG. 10 is a cross-sectional view of the display 200 and the lenticular lens 300.

FIG. 10 is a cross-sectional view of the display 200 and the lenticular lens 300 in a case where the enlarging operation by the rearranging module 2 and the scaling module 3 is not performed, and a multiple parallax image signal having "1280*9" values in the horizontal direction is displayed on the display 200. The sub-pixel 42a shown in FIG. 8 corresponds to a sub-pixel 42b shown in FIG. 10 before the enlarging operation. The light emitted from the sub-pixel 42b is outputted in the direction represented by a straight line 54. Likewise, a sub-pixel 43b corresponding to the sub-pixel 43a is outputted in the direction represented by a straight line 55. As a result, the image can be stereoscopically viewed only in the region 62 inside the straight line 54 and the straight line 55 (the shaded region in FIG. 10).

In the region 61 according to the present embodiment shown in FIG. 8, on the other hand, images can be stereoscopically viewed from positions closer to the display 200 comparing to the region 62 shown in FIG. 10. Also, the region 61 in which images can be stereoscopically viewed is also larger comparing to the region 62 in a condition where the distance from the display 200 is fixed.

Although there are "1280 *9+4" values in the horizontal direction in FIG. 8, the two values on the left end and two values on the right end are not to be displayed. Therefore, the scaling module 3 may not generate them.

Figure 11:
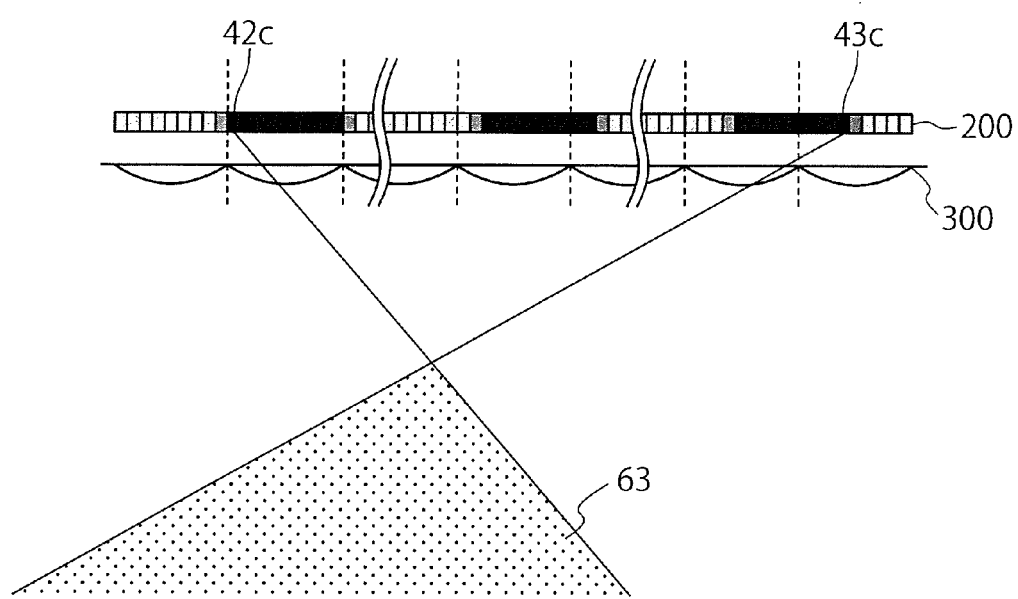
FIG. 11 is a cross-sectional view of the display 200 and the lenticular lens 300.

In the example in FIG. 8, the "1280 *9" values in the center of the successive parallax image signal are displayed on the display 200. However, it is possible not to display the four values corresponding to the four sub-pixels on the right end among the "1280 *9+4" values, and display the other values of the "1280 *9+4" values, as shown in FIG. 11. The light emitted from sub pixels 42c and 43c corresponding to the sub-pixels 42a and 43a of FIG. 8 respectively are outputted in the directions shown in FIG. 11. In a case of FIG. 11, the successive parallax image signal slides to the sub-pixels on the right side compared to the successive parallax image signal in a case of FIG. 8, and thus, the region 63 in which images are stereoscopically viewed shifts to the left. Therefore, when the viewer exists on the left side of the display 200, images are preferably displayed as shown in FIG. 11.

In the scaling module 3 shown in FIG. 7, the delay signal and coefficients to be selected are controlled by the register 34, by which the successive parallax image signal for being displayed as shown in FIG. 11 can be generated. Therefore, adjusting the positions of the sub-pixels to be displayed is also referred to as "scaling".

Figure 12:
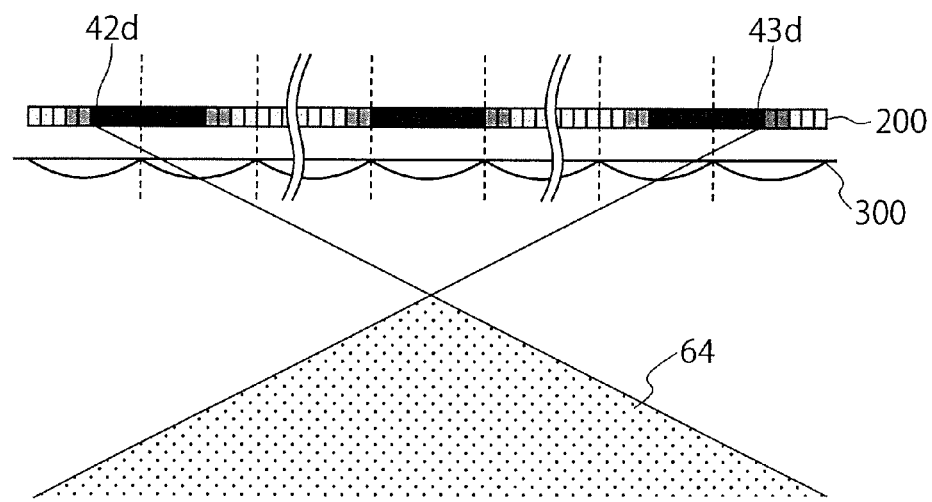
FIG. 12 is a cross-sectional view of the display 200 and the lenticular lens 300.

In each of the cases in FIGS. 8 and 11, a successive parallax image signal having "1280 *9+4" values in the horizontal direction is generated. On the other hand, the scaling module 3 may enlarge the signal at a scaling factor of (1280 *9+8)/(1280*9) to generate a successive parallax image signal having 1280 *9+8 values in the horizontal direction, for example. In that case, the light emitted from sub-pixels 42d and 43d of FIG. 12 corresponding to the sub-pixels 42a and 43a respectively of FIG. 8 are output in the directions shown in FIG. 12. Since the number of values in the successive parallax image signal in the horizontal direction is larger than that in a case of FIG. 8, images can be stereoscopically viewed from positions even closer to the display 200. Generally, as the number of values in the horizontal direction becomes larger, images can be stereoscopically viewed from positions closer to the display 200, while the region in which images can be stereoscopically viewed becomes narrower in positions further away from the display 200.

As described above, the optimum positions and optimum number of sub-pixels to be displayed vary according to the position of the viewer. Therefore, the positions and number of sub-pixels to be displayed, and the scaling factor to be used by the scaling module 3 may be adjusted in accordance with the position of the viewer. Those adjustments can be controlled by the delay signals and coefficients selected by the register 34 of the scaling module 3.

The position of the viewer may be automatically acquired by a sensor (a camera sensor, for example). Alternatively, the position of the viewer may be set by the viewer using a remote controller or the like. In such a case, the viewer may transmit the viewer's position information to the image display apparatus, or it is also possible to display a graphical user interface (GUI) for adjustment on a part of the display 200. More specifically, a three-dimensional sample image and an adjustment bar (a two-dimensional display) corresponding to the scaling processing of the scaling module 3 are displayed. When the viewer performs a cursor selecting operation or the like with a remote controller, the adjustment bar expands and contracts with the operation, and the scaling processing, that is, the scaling factor to be used by the scaling module 3 and the positions to be displayed on the display 200, is adjusted. As a result, image signals are viewed in a different form. By using such a GUI, the viewer may set the adjustment values so that the three-dimensional sample image can be viewed in an optimum manner.

In the present embodiment, an input image having "1280" pixels in the horizontal direction is inputted, and the number of pixels in the horizontal direction is made larger than "1280" by the scaling module 3. However, even when the number of pixels in the horizontal direction is smaller than "1280" in the input image, the number of pixels in the horizontal direction in the input image is increased to "1280", and the input image is then displayed, so that the stereoscopic viewing region can be made larger. Alternatively, a successive parallax image signal may be enlarged in the horizontal direction with a fixed scaling factor, and at least a part of the successive parallax image signal may be displayed on the sub-pixels of the display 200 in accordance with the position of the viewer. The scaling module 3 may scale-down the successive parallax image signal, and display the successive parallax image signal in an appropriate position on the display 200.

Although the lenticular lens 300 is used in this embodiment, a parallax barrier or a polarizing plate may be used as a parallax controller for outputting light emitted from sub-pixels of the display 200 in a specific direction.

As described above, in the present embodiment, an input image is enlarged in the horizontal direction and is then displayed. Accordingly, the region in which images are stereoscopically viewed can be made larger.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image display apparatus comprising:
   a rearranging module configured to rearrange a first parallax image signal, which comprises a plurality of sub-pixel signals each of which comprises a predetermined number of color signals, in series by each of the color signals to generate a second parallax image signal, which comprises the predetermined number of color signal series each of which corresponds to each of the color signals;
   a scaling module configured to scale each of the color signal series included in the second parallax image signal in a horizontal direction to generate a third parallax image signal;
   a display configured to display at least a part of the third parallax image signal; and
   a parallax controller configured to output light emitted from the display to a specific direction,
   wherein a range in which an image displayed on the display using the third parallax image signal is capable of being viewed stereoscopically to a viewer is wider than a range in which an image displayed on the display using the second parallax image signal is capable of being viewed stereoscopically to the viewer.

2. The apparatus of claim 1, wherein the scaling module is configured to scale the second parallax image signal according to a position of a viewer viewing the display.

3. The apparatus of claim 1, wherein the scaling module is configured to scale the second parallax image signal with a scaling factor depending on a position of a viewer viewing the display.

4. The apparatus of claim 3, wherein the scaling module is configured to set the scaling factor larger as the viewer is closer to the display.

5. The apparatus of claim 1 further comprising a multiple parallax image generator configured to generate the plurality of first parallax image signals based on an input image signal.

6. The apparatus of claim 1, wherein the parallax controller is a lenticular lens.

7. An image processing device comprising:
a rearranging module configured to rearrange a first parallax image signal, which comprises a plurality of sub-pixel signals each of which comprises a predetermined number of color signals, in series by each of the color signals to generate a second parallax image signal, which comprises the predetermined number of color signal series each of which corresponds to each of the color signals; and
a scaling module configured to scale each of the color signal series included in the second parallax image signal in a horizontal direction to generate a third parallax image signal to widen a stereoscopic viewing area,
wherein a range in which an image displayed on a display using the third parallax image signal is capable of being viewed stereoscopically to a viewer is wider than a range in which an image displayed on the display using the second parallax image signal is capable of being viewed stereoscopically to the viewer.

8. The device of claim 7, wherein the scaling module is configured to scale the second parallax image signal according to a position of a viewer viewing a display on which at least a part of the third parallax image signal is displayed.

9. The device of claim 7, wherein the scaling module is configured to scale the second parallax image signal with a scaling factor depending on a position of a viewer viewing the display on which at least a part of the third parallax image signal is displayed.

10. The device of claim 9, wherein the scaling module is configured to set the scaling factor larger as the viewer is closer to the display.

11. The device of claim 7 further comprising a multiple parallax image generator configured to generate the plurality of first parallax image signals based on an input image signal.

12. An image processing method comprising:
rearranging a first parallax image signals, which comprises a plurality of sub-pixel signals each of which comprises a predetermined number of color signals, in series by each of the color signals, to generate a second parallax image signal, which comprises the predetermined number of color signal series each of which corresponds to each of the color signals; and
scaling each of the color signal series included in the second parallax image signal in a horizontal direction to generate a third parallax image signal to widen a stereoscopic viewing area,
wherein a range in which an image displayed on a display using the third parallax image signal is capable of being viewed stereoscopically to a viewer is wider than a range in which an image displayed on the display using the second parallax image signal is capable of being viewed stereoscopically to the viewer.

* * * * *